United States Patent Office 3,298,075
Patented Jan. 17, 1967

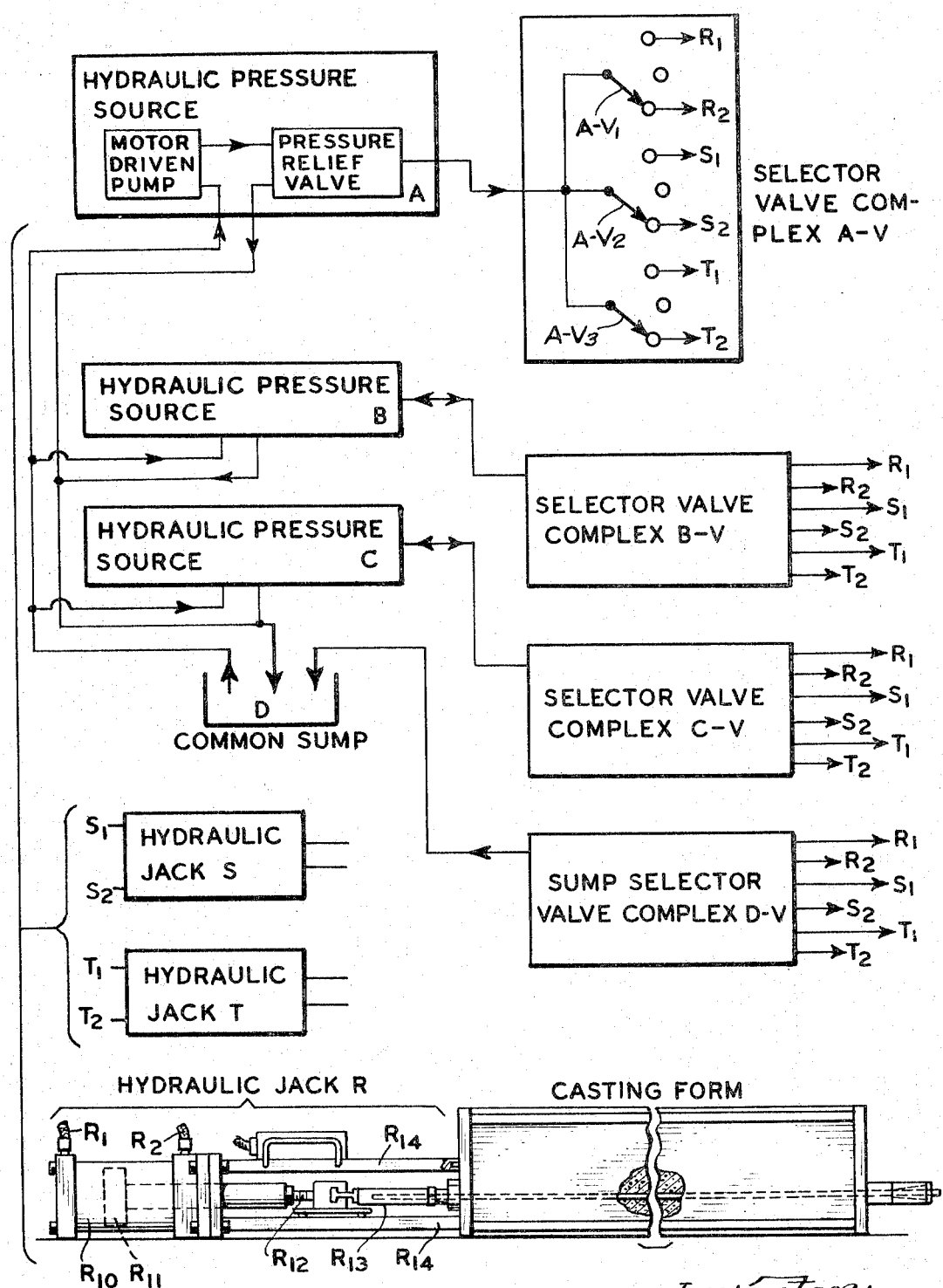

3,298,075
STRAND TENSIONING SYSTEM
Theodore W. Shoe, Troy, Ohio, assignor to The Flexicore Co., Inc., Dayton, Ohio, a corporation of New York
Filed Oct. 4, 1965, Ser. No. 492,482
6 Claims. (Cl. 25—118)

This invention relates to a strand tensioning system and is an improvement upon the system disclosed in the co-pending application Serial No. 86,689 filed February 2, 1961, now Patent Number 3,207,829, assigned to a common assignee.

In the manufacture of long concrete slabs carrying longitudinal steel reinforcing strands, it is necessary to tension at least some of such reinforcing strands to a predetermined value or values for controlling slab characteristics. While the aforementioned application is concerned with the tensioning of strands in slabs having a length of the order of about 50 or 60 feet or less, the present invention may be applied advantageously in connection with slabs of any length.

A strand in a slab may have to be tensioned to one of a number of predetermined values depending upon the characteristics desired in the slab. Even in the same slab, there may be a number of separate strands some of which must be tensioned to one value and others tensioned to a different value.

Strand tensioning systems usually involve one or more hydraulic jacks, each of which may be used to tension one or more strands. The present invention utilizes one or more hydraulic jacks, at least one of which has a double acting cylinder with a piston movable therein. In accordance with the invention, the low fluid pressure side of a piston is not, as is customary in this art, at atmospheric pressure. Instead, fluid at predetermined pressures is applied to the opposite sides of a piston to obtain a net force which tends to move the piston in a desired direction. This requires a plurality of different pressure sources any two of which may be selected for application to opposite sides of a piston, apart from the zero or atmospheric pressure connection which may also be used. Assuming that there are three sources, A, B and C of hydraulic pressure, and a common sump at atmospheric pressure, the following pressure combinations are possible; hydraulic pressure sources A and B; A and C; A and zero (this is at atmospheric pressure); B and C; B and zero; and C and zero. These pressure combinations are based upon the assumption that the pressures are applied for strand tensioning movement of the piston in one direction only. If, for some reason, piston movement under such pressure combinations is desired in both directions, then twice the number of pressure combinations are obtainable. However, for strand tensioning purposes, the movement of the piston in a direction for tensioning strands is the only movement whose force must be carefully controlled. Reverse piston movement as a rule is desirable only for the purpose of returning the various strand tensioning means to a normal starting position.

It is understood that the area of a piston on the piston rod side available for hydraulic pressure is less than the piston area on the free side of the piston by the area of the piston rod section. Accordingly, for piston movement, compensation for this reduced area must be made where the fluid force on the piston rod side is to be greater than the fluid source on the other piston side.

For an understanding of the invention, reference will now be made to the drawing wherein the single figure illustrates in diagrammatic form an exemplary embodiment of the invention.

In the drawing, A, B, and C are respectively sources of fluid under predetermined high pressures. The pressure obtainable from source A will be higher than that obtainable from source B which, in turn, is higher than the pressure obtainable from source C. The differences between the various fluid pressure sources are great enough so that positive piston movement will always occur in spite of the different effective piston areas on the two sides thereof.

The various fluid pressure sources A, B, and C (the number of pressure sources may be as great as desired) may take on a variety of forms. One example of a fluid pressure source for operating a hydraulic jack is disclosed in the file of the application previously identified. There are well known hydraulic pressure generating means available in the market so that a detailed description thereof is unnecessary. In a simplified form, a hydraulic fluid pressure source may comprise a motor-driven pump whose output is fed to a pressure relief valve system which has its output available for use to be applied to a hydraulic jack. In the hydraulic pressure system disclosed in the application referred to above or in systems generally available in the prior art, the return from the hydraulic jack cylinder is to a sump.

Fluid pressure sources B and C may resemble fluid pressure source A with the output pressures successively lower. Any modification of the system to combine the various hydraulic fluid pressure sources to provide a single complex source having a number of different hydraulic fluid pressures may be made.

As shown in the drawing, hydraulic fluid pressure source A has lines for liquid flow to and from common sump D in addition to the output line. The output line from hydraulic pressure source A is fed to a selector valve complex A-V. Selector valve complex A-V has three selector valve portions A-V1; A-V2; A-V3 each one of which has three settings as indicated. Thus, selector valve portion A-V1 can be coupled to lines R1; R2 or to a dead position where the line from pressure source A is blocked. Similarly selector valve portion A-V2 can be coupled to lines S1 or S2 or to a dead position. Selector valve portion A-V3 can be coupled to lines T1; T2 or to a dead position. Thus, pressure source A can be simultaneously coupled to one, two or three lines as desired.

The lines which have letters R, S and T go to hydraulic jack systems R, S and T respectively. For simplicity only one jack system R is illustrated diagrammatically and has cylinder R10 in which operates piston R11. Piston R11 has piston rod R12 extending outwardly beyond the end of the cylinder. Piston rod R12 may be detachably secured to a strand gripping member such as a chuck R13. The hydraulic jack has legs R14 to be placed against the end wall of a casting form for the purpose of tensioning a strand extending longitudinally of the casting form. The actual details of the chuck and jack arrangement are illustrated in the application previously identified. This is exemplary and any other hydraulic jack arrangement may be used.

Cylinder R10 has fluid connections R1 and R2 at opposite ends thereof so that hydraulic fluid may be fed into the cylinder on opposite sides of piston R11. For convenience, connection R1 will be considered as being on the piston side of the cylinder while connection R2 will be considered as being on the piston rod side of the cylinder.

Jacks S and T may have pistons and piston rods which are different in diameter from piston R11 and piston rod R12 of jack R. This makes it possible to obtain different forces in jacks S and T with the same hydraulic pressures as in jack R. Jacks S and T will have a strand gripping means as for R.

Pressure sources B and C are respectively provided with valve complexes B-V and C-V. Each such valve complex is the same as A-V.

Arrows show the direction of fluid flow. Fluid sources B and C should permit of two way fluid flow. As hereinbefore pointed out, the pressure difference between A and B is great enough so that an effective total pressure differential can be obtained between A and B for strand tensioning piston movement. Similarly the difference in output pressure between sources B and C should also be great enough to obtain strand tensioning.

In addition to the selector valve arrangements for pressure sources, A, B and C, there is one sump selector valve complex D-V, which has its output connected to common sump D. This sump selector valve complex going to the common sump is provided for the purpose of coupling any desired line on each hydraulic jack system to the common sump. Common sump D may be regarded as a zero atmospheric pressure source, requiring means to connect the various hydraulic jacks thereto. The fluid from sump selector valve complex D-V travels in only one direction.

Line R1 should not be coupled to more than one hydraulic pressure source at any one time. The same applies to R2; S1 and S2; and T1 and T2. Interlocking means may be provided to prevent undesired settings of selector valve complexes at any one time or any operator can observe these precautions.

There may be any desired number of hydraulic pressure sources and there may also be any desired number of hydraulic jacks. Assuming that each hydraulic jack must be able to be coupled on either side of the piston to any one of a number of hydraulic pressure sources, then there will be as many selector valve complexes as there are hydraulic pressure sources and each selector valve complex will have as many outlets as there are hydraulic jacks multiplied by two. Insofar as common sump D is concerned, only one sump selector valve complex is required and will have as many connections as the total number of jacks times two. Thus, a large number of pressure combinations are possible for application to any one hydraulic jack. In addition, if jack R has a piston or piston rod whose diameters are different than jack S, then the same pressure differential across the piston in one jack will also provide a different operating force on the piston in the two jacks depending upon the differences in area as hereinbefore explained. The system may be simplified if no particular piston force is desired on the return stroke. In such case, R1, S1 and T1 need be connected to only one pressure source, A, B, or C; R2, S2 and T2 need be connected to sump D at the same time for piston return.

It is understood that the various valve complexes may be operated by electromagnetic means and such electromagnetic means may have suitable interlocks to prevent undesired valve operations with the valves themselves being simple valves. Insofar as hydraulic pressure sources B and C are concerned, since these are lower than A, it is possible that fluid under pressure may have to be forced backwardly into the hydraulic pressure source, thence to common sump D. Accordingly, the various hydraulic pressure sources should be so arranged that such flow of liquid is possible.

What is claimed is:

1. A system for tensioning steel strand in a concrete structure, said system including at least one hydraulic jack, said jack having a double acting piston with a piston rod extending from one side of said piston, means mechanically coupled to said piston rod for applying tension to at least one strand when said piston is urged by fluid pressure in one direction away from the piston rod side of the piston, said piston having a predetermined area subject to fluid pressure on the other side of said piston, said piston having the one side thereof of area reduced by the cross sectional area of the piston rod, a source of fluid at a predetermined high pressure, a source of fluid at an intermediate pressure, a sink constituting a source of fluid at atmospheric pressure, and means including valves and fluid lines for selectively connecting any two of said three fluid sources on opposite sides of the piston to obtain a net resultant force for causing said piston to move, the differences in pressures in said fluid sources being at least great enough so that the higher pressure source when applied to the reduced area on the one piston will more than compensate for the full piston area of the other piston side when exposed to less pressure whereby said fluid sources can be used to apply three different tensioning forces on said strand.

2. In a system for tensioning steel strand in a concrete structure, said system including at least one hydraulic jack, such jack having a double acting piston and piston rod with hydraulic fluid connections to each end of said piston for securing such double action, said piston having a piston rod extending from one side thereof, which piston rod reduces the effective area of said piston as compared to the full area of the other side of said piston, a plurality of sources of hydraulic fluid under separate, different, predetermined high pressures, a sink constituting a source of fluid at atmospheric pressure, and means including fluid lines from said fluid sources for selectively connecting any two of such fluid sources on opposite sides of said piston, the differences in pressures being sufficiently great so that the piston rod side of said piston is subject to a total force which exceeds the force on the other side of said piston when the piston rod side of said piston is subjected to a fluid pressure which is greater than the fluid pressure on the other side of said piston at a pressure which is below but nearest in value from all the available pressure sources.

3. The combination of an elongated casting form for casting concrete slabs, steel reinforcing strands disposed in said form for longitudinal prestressing of said slabs and means for tensioning said strands, said means including at least one hydraulic jack, such jack having a double acting piston and piston rod with hydraulic fluid connections to each end of said piston for securing such double action, said piston having a piston rod extending from one side thereof, which piston rod reduces the effective area of said piston as compared to the full area of the other side of said piston, a plurality of sources of hydraulic fluid under separate, different, predetermined high pressures, a sink constituting a source of fluid at atmospheric pressure, means including fluid lines from said fluid sources for selectively connecting any two of such fluid sources on opposite sides of said piston, the differences in pressures being sufficiently great so that the piston rod side of said piston is subject to a total force which exceeds the force on the other side of said piston when the piston rod side of said piston is subjected to a fluid pressure on the other side of said piston at a pressure which is below but nearest in value from all remaining available pressure sources, and means for coupling the piston rod to a strand to be tensioned, said piston, during strand tensioning tending to move away from said strand.

4. In a method for tensioning steel strand in a concrete structure for prestressing where a hydraulic jack having a double acting piston in a cylinder is used for tensioning, the steps which comprise selecting two of a plurality of hydraulic pressure sources providing substantially different pressures above atmosphere and coupling such selected pressure sources to said hydraulic jack cylinder on opposite sides of said piston to obtain piston movement for strand tensioning whereby the operational flexibility of a strand tensioning system utilizing different pressure sources and a common sump at atmospheric pressure is increased.

5. A system for tensioning steel strand in a concrete structure, said system including at least two hydraulic jacks, each jack having a double acting piston with a piston rod extending from one side of said piston, means mechanically coupled to each piston rod for applying tension to strands when each piston is urged by fluid pressure in one direction away from the piston rod side of the piston, each piston having a predetermined area subject to fluid pressure on the other side of said piston, each piston having the one side thereof of area reduced by the cross sectional area of the piston rod, a source of fluid at a predetermined high pressure, a source of fluid at an intermediate pressure, a sump constituting a source of fluid at atmospheric pressure, and means including valves and fluid lines for selectively connecting any two of said three fluid sources on opposite sides of each piston to obtain a net resultant force for causing such piston to move, the differences in pressures in said fluid sources being at least great enough so that the higher pressure source when applied to the reduced area on a piston will more than compensate for the full piston area of the other piston side when exposed to less pressure whereby said fluid sources can be used to operate said jacks to apply different tensioning forces on strands.

6. In a system for tensioning steel strand in a concrete structure, said system including at least two hydraulic jacks, each such jack having a double acting piston and piston rod with hydraulic fluid connections to each end of said piston for securing such double action, each piston having a piston rod extending from one side thereof, which piston rod reduces the effective area of said piston as compared to the full area of the other side of said piston, a plurality of sources of hydraulic fluid under separate, different, predetermined high pressures, a sump constituting a source of fluid at atmospheric pressure, and means including fluid lines from said fluid sources and valves for selectively connecting any two of such fluid sources on opposite sides of one or more of said pistons, the differences in pressures being sufficiently great so that the piston rod side of a piston is subject to a total force which exceeds the force on the other side of said piston when the piston rod side of said piston is subjected to a fluid pressure which is greater than the fluid pressure on the other side of said piston at a pressure which is below but nearest in value from all the available pressure sources, said values providing for connecting any fluid pressure source to any side of any piston of any one or more jacks.

References Cited by the Examiner
UNITED STATES PATENTS

| | | | |
|---|---|---|---|
| 3,089,215 | 5/1963 | Stubbs | 25—118 |
| 3,194,536 | 7/1965 | Simms | 254—29.5 |
| 3,207,829 | 9/1965 | Nieber et al. | 264—228 |

WILLIAM FELDMAN, *Primary Examiner.*
MILTON S. MEHR, *Examiner.*